Nov. 12, 1963    D. H. BENSON ETAL    3,110,579
METHOD OF MAKING A DIAMOND ABRASIVE SAW BLADE
Original Filed Jan. 4, 1960    2 Sheets-Sheet 1

Nov. 12, 1963 D. H. BENSON ETAL 3,110,579
METHOD OF MAKING A DIAMOND ABRASIVE SAW BLADE
Original Filed Jan. 4, 1960 2 Sheets-Sheet 2

3,110,579
METHOD OF MAKING A DIAMOND ABRASIVE SAW BLADE

Donald H. Benson, Spencerport, and Willard R. Pratt, Rochester, N.Y., assignors to Vanguard Abrasive Corporation, New York, N.Y., a corporation of New York
Original application Jan. 4, 1960, Ser. No. 410. Divided and this application Aug. 22, 1960, Ser. No. 50,936
5 Claims. (Cl. 51—293)

The present invention relates to the method of manufacturing diamond abrasive saw blades or cut-off disks and, more particularly, to saw blades of the type formed by a strong, circular sheet metal drive core having one or more cutting elements containing dispersed diamond dust secured around its periphery by a metallic bond.

The manufacture of diamond abrasive saws of the metallic bonded variety has been classically divided into three distinct groups, all of which are well known in the trade at the present time. The first of these groups is the serrated or notched rim type blade old in the art and probably the earliest concept of the diamond cutting disk or saw. This type of blade was made originally by notching or slitting a disk of steel or copper and inserting into these fine hacks a paste of diamond grit and a holding material like petroleum jelly. Improvements to the article itself have included introducing along with the diamond grit different holding materials such as various metal powders. Improvements in the method of manufacture of the cutting disk have included rolling the area in which the notches occur either hot or cold and further swaging or deforming the blade body to hold the diamond grit more securely. The notched rim type of saw has the merit of being reasonably indestructible but cuts so poorly that it has no real acceptance in any serious industrial applications, although it is satisfactory in the case of the lowest priced blades which are used in home hobby type operations such as the lapidary avocation. In almost every commercial operation the use of this blade has been abandoned because of its inferior characteristics. The dull and comparatively worthless character of the cutting disk made in this manner is due to the crushing and destruction of the diamond grit caused by the hot or cold rolling operations and the final truing roll that is given to the disk in practically all cases. A further reason lies in the very small dimensions of the notch or slit in the periphery of the solid metallic core into which an attempt is made to place sufficient diamond grit and holding material to do a satisfactory cutting job.

The second group of saw blades consists of a cutting disk having around its periphery a continuous annulus of compressed and matured metallic powder containing diamond dust. This blade has been traditionally made by cold molding the metal powder and diamond dust annulus around a steel body and sintering or otherwise maturing the annulus to a sufficient strength to hold the diamond dust well and to cut freely. This type of blade is in most respects the best cutting blade of all of the groups, but has the disadvantage of being physically frail and liable to injury in usage, due to the delicate nature of the bond between the annulus and the core. Various mechanical devices have been proposed to improve the bond, but in general due to the shortcomings of the manufacturing method, the cutting disk so made is fragile. Its use is confined in large part to precision operations such as germanium cutting, optical glass cutting, and other nice uses that fall more or less into the instrument making classes.

The third and most recent group of saw blades is the discontinuous rim or segmental type. This cutting disk is made by manufacturing a series of short arcuate segments containing diamond powder in a metallic body. These segments are usually about 1½ inches long and are ordinarily silver soldered or brazed to the rim of a steel core which has been divided into sections of approximately the segment length by chopping or sawing the rim radially. Without these discontinuities the saw disk could not readily be made owing to the great stresses created in the disk by heating only its periphery. The segmented blade has been accepted by those fields that are prone to give the hardest usage to the blades, such as the concrete sawing and masonry cutting field where rough abrasive cutting is done. Even though the construction of this type of blade has been developed to a high point of perfection, many accidents occur to the blades and loss of segments is very common. Some of the reason for this is the very presence of the discontinuities between the cutting segments which present an opening into which the material being cut may be jammed or wedged, and which also acts as a stress riser, these two factors often combining to strip off a section. A second disadvantage is the mechanical impossibility of exactly situating or placing the segments on the core during the brazing operation. The presence of a molten area between the core and segment allows motion of the segment in relation to the core and a subsequent departure from accurate placement. This too often contributes to segment loss due to the hammering that occurs each time the segment protruding beyond the others in an axial direction engages in the cut.

Another difficulty encountered in the manufacture of saw blades of the second and third groups is the cost of making, maintaining, and replacing the molds that are used in the production of the segments or rims for the cutting disks. Since the matrix material contains diamonds, the abrasive character of the mixture can readily be visualized. The wear and tear of the die or mold is such that in a short time it is worn out.

Accordingly, an object of the invention is to provide a new and improved diamond abrasive saw blade of the kind described, avoiding many of the disadvantages of prior types.

Another object is the provision of a cutting disk having peripheral diamond bearing cutting elements so arranged as to produce a superior cutting action.

Yet another object is to provide a new and improved diamond abrasive saw blade in which the peripheral cutting elements are bonded to the metallic core with a greater bond strength, and in which the attachment of the cutting elements to the core is designed to reduce under cutting.

A further object is the provision of a cutting disk having a completely unitary construction with the peripheral diamond bearing cutting elements enclosed by and protected within the metal of the edge of the core itself, whereby the cutting elements are protected from shock since there are no protrusions to catch and tear off.

A still further object is the provision of a new and improved method of manufacture of a diamond abrasive saw blade resulting in essentially a new mold for each blade, thereby reducing the cost of manufacture.

Another object is to provide a new and improved method of manufacture of a cutting disk of the kind described that combines the formation of the diamond bearing cutting elements and the act of bonding them to the core blade in one operation, thereby reducing manufacturing costs.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
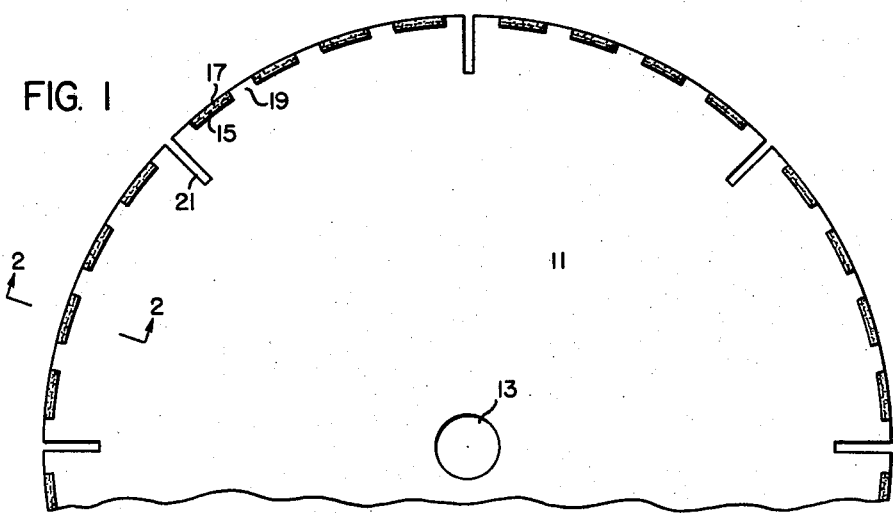
FIG. 1 is a fragmentary face view of a diamond abrasive saw blade according to a preferred embodiment of the invention.

In FIG. 1 is illustrated a diamond abrasive saw blade or cut-off disk including a central sheet metal drive disk or core 11 made of a suitable wrought metal, preferably steel, and provided with a central aperture 13 for mounting the disk on a rotating shaft. The periphery of the core 11 has a plurality of circumferentially spaced relatively shallow grooves or indentations 15 in each of which is secured a diamond containing cutting element 17 by a suitable metallic bond. As viewed from the face of the saw blade, the cutting elements 17 are arcuate and have outer cutting edges flush with the protrusions 19 of the core 11 between the grooves 15 extending to the outer diameter of the core 11. The bottom edges of the grooves 15 are circular arcs having the center of the core 11 as their centers of curvature, while the end edges are substantially radial, the cutting elements 17 being correspondingly shaped. The length of the grooves 15 in a circumferential direction is sufficiently great to avoid being classified as a notch or slit, and are at least one-fourth of an inch in length. Since in the final result the grooves 15 present the bed or socket for the diamond containing cutting elements 17, it can be readily seen that making the grooves 15 too short will result in an insufficient area to hold and disperse the diamond grit efficiently. Too long a length, on the other hand, will prevent sufficient encapsulation or support on the ends of the cutting elements 17 by the core 11. For a reason to be explained, the core 11 of FIG. 1 has a plurality of relatively long radial slots 21 spaced about its periphery at a considerably greater circumferential spacing than the individual cutting eelments 17, each slot being disposed between two adjacent grooves 15.

Figure 2:
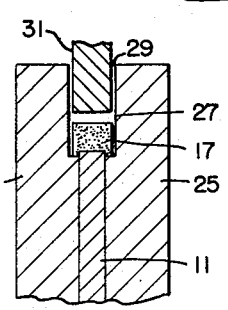
FIG. 2 is a fragmentary radial cross section of the saw blade of FIG. 1 taken approximately on the line 2—2 thereof through one of the cutting elements.

The cutting elements 17 are composed of diamond grit embedded and dispersed in a hard matrix material such as a mixture of bronze and iron. The particular metal mixture mentioned is preferred at the present time, but it is understood that the scope of the invention covers any suitable hard abrasive grit dispersed in any suitable hard mixture material. As seen in FIG. 2, the cutting elements 17 are approximately rectangular in cross section and have a slightly greater width than the core 11 to extend outwardly beyond the surfaces of the core 11 by a small equal amount at either side. The diamond bearing elements or sections 17 are wider than the body of the core 11 to provide for clearance during cutting, acting similar to the "set" on a wood or metal cutting saw blade.

The cutting sections 17 overlap the peripheral edge of the core 11 at the bottom edges of the grooves 15 in a radial direction to a small extent. This overlapping contributes to the prevention of undercutting during the rotating operation of the saw blade. In the case of continued use of saw blades of the type here described, difficulties have been encountered with the drive core being worn out at the region of the circular junction edge to the base or inner edge region of the diamond containing cutting sections. This wear is caused by the abrasive action of loose abrading particles on the rotating circular junction edge region of the metallic drive core which sharpens and thins the drive core at the critical circular junction periphery to which the cutting sections are bonded. This sharpening and cutting of the metallic periphery of the drive core weakens the bonding junction so as to cause premature breaking off of the cutting sections from the drive core. In the present construction the tendency toward undercutting or underwearing is substantially reduced by the overlapping inner edges of the cutting sections 17.

During the rotating cutting action, it can be seen that the outer edges of the protrusions 19 of the core 11, between the various grooves 15 and cutting sections 17, engage in the cut in the material being sawed, which cut is made primarily by the diamond grit embedded in the cutting sections 17. In the past it has been incorrectly but universally assumed that it is harmful or actually impossible to get a saw to cut, if the periphery has any appreciable areas of metal flush with the surface to be cut which do not contain dispersed diamond grit. This has proven to be a complete misconception, as a saw blade made in accordance with the present invention not only has a peripheral work contacting area, from 20 to 60 percent of which is made up of metal free of diamond, but actually this diamond free metal has merit in the cutting action by preventing the blade from "digging in" or "grabbing" in the cut.

Figure 3:
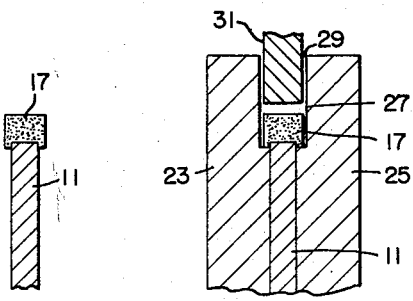
FIG. 3 is a fragmentary radial cross section through the saw blade in an intermediate step of manufacture, showing oppositely disposed graphite plates forming a mold and a punch for compressing the material of the peripheral cutting element.

In accordance with the invention, the method of manufacture of the diamond abrasive saw blade constitutes as a single step the formation and the bonding of the cutting elements to the grooves 15 of the bore body 11. The matrix material for the cutting sections 17 is usually provided in powder form which is heated and compressed in a mold or die to form a hard abrasive material. The present method of manufacture utilizes the core body 11 itself as a portion of the mold for the compression of the matrix. To accomplish this, the core 11 is made larger in diameter than the finally desired result, and the grooves 15 are likewise made several times (e.g., two or three times) deeper in a radial direction than the final radial thickness of the metal matrix diamond material which is to be fused into it. As shown in FIG. 3, a pair of graphite plates 23 and 25 are clamped to the opposite sides of the core 11, the plates 23 and 25 having a diameter about the same as that of the enlarged core disk 11. The concentricity of the assembly may be maintained by having a centrally located aperture in the core 11 (such as aperture 13) and in the graphite plates 23 and 25, into which is inserted an arbor for lining up all pieces.

To provide for the slightly greater width of the finished cutting section 17 as compared to the core 11, and to provide for the overlapping of the cutting element 17 beyond the bottom of the groove 15, each graphite plate 23 or 25 is provided with a peripheral annular groove or ring 27 on its inner surface. The axial space between the two annular rings 27, of course, corresponds to the width of the final product cutting section 17, the extension of the rings 27 in a radial direction beyond the base of the groove 15 corresponding to the amount of overlap desired. The core 11 and the plates 23 and 25 assembled in this manner define a cavity 29 having the appearance of a mold or die, the cavity being defined at the base and ends by the groove 15 and rings 27, and at the sides by the annular rings 27.

Flux is applied to the cavity 29 and a bonding medium may, although it is not always needed, be inserted to enhance the joint between the metal body matrix and the core 11. The binding medium may be, for example, silver solder, tin, or a phosphorous bearing compound such as "Sil Phos." The metal powder containing the diamond grit is then placed in the cavity 29.

Preferably the diamond bearing metal matrix powder is pre-sintered in a suitable graphite mold to create a slug of the desired mixture sufficiently fritted together to be handled. This is more satisfactory than attempting to insert loose powder into the cavity 29. The slug cavities in the separate graphite mold for pre-sintering have the same circumferential dimensions and width as the finished cutting element 17, but are larger in a radial direction by about a ratio of two to one to allow for compression of the slugs in a manner to be explained later. These slugs are desirably fritted together in an atmosphere controlled furnace at a suitable high temperature for the metal powder or powders being used.

The pre-sintered cutting section slugs are now inserted into the mold cavities 29. Further compression of each slug in a radial direction is achieved by a punch 31 of graphite having a small amount of clearance on the sides and ends of the cavity 29 to allow it to slide easily into the cavity area. A punch 31 of tungsten carbide, steel, or some other suitable material may be used. The core 11 and graphite plate assembly illustrated in FIG. 3 is now heated to a high sintering temperature appropriate for the metallic materials involved. The heat may be applied by resistance heating by passing a current through the graphite plates 23 and 25, however high frequency heating or high intensity heaters of the gas fired type may also be employed. At the time of the application of the heat, the punches 31 are simultaneously pressed to consolidate the diamond bearing matrix material. The action results in a simultaneous sintering, consolidation, and bonding of the blade.

Figure 4:
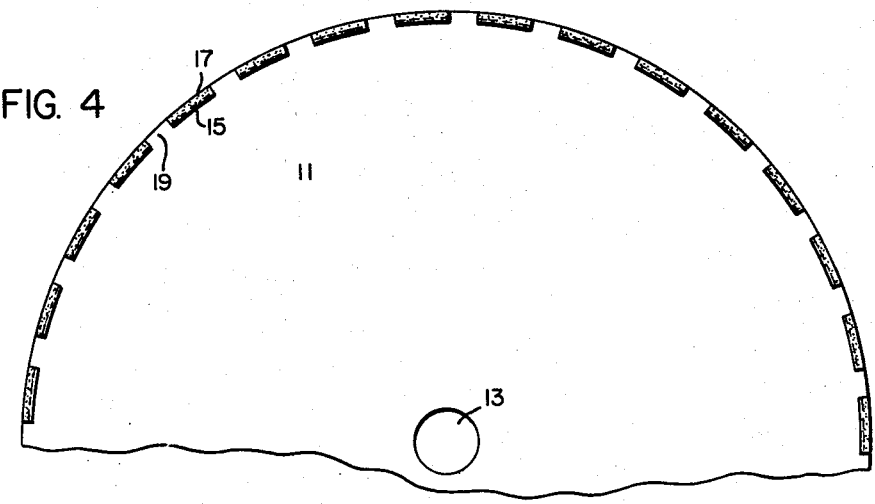
FIG. 4 is a fragmentary face view similar to FIG. 1 of a second embodiment of the invention.

In the saw blade illustrated in FIG. 1, having the radial slots 21, an individual discreet area of the core 11 between two adjacent radial slots 21 is heated rather than heating the entire core 11. It is for the purpose of introducing a minimum of stress in heating only a portion of the core 11 that the radial slots 21 are employed. According to this practice, the portion of the saw blade between two radial slots 21 is worked on at a time, and the operation is repeated for the various other radial segments. However, it is possible to heat the entire core body 11, thereby to eliminate the stresses caused by heating only a portion of the core 11, in which case the radial slots 21 are not needed, as shown in FIG. 4. The saw blade of FIG. 4 is manufactured in the same manner as described and is identical to FIG. 1 with the exception that the radial slots 21 are omitted.

Upon the cooling of the mold assembly shown in FIG. 3, the graphite plates 23 and 25 are removed. The manufacture of the saw blade is completed by removing the metal prongs of the core 11 extending radially outwardly beyond the outer cutting edge of the cutting elements 17. It will be recalled that the core 11 was originally made to a larger diameter than the final product saw blade to facilitate creation of the molding cavities 29.

As an example of the foregoing method of manufacture, a core 11 of tool steel 10¾ inches in diameter and .064 inch thick is provided, and 10 radial slots 21 are cut into the periphery of the core 11 distributed equally in a circumferential direction. Between each pair of adjacent radial slots 21 four grooves 15 are cut equally spaced from one another to a depth of 7/16 inch in a radial direction. Each groove 15 is ½ inch wide in a circumferential direction and is separated from adjacent grooves by a core protrusion 19 of ¼ inch width in a circumferential direction. The annular rings or grooves 27 to be machined into the graphite plates 23 and 25 are cut to a depth of .008 inch and extended radially inward for .445 inch. The bottoms and sides of the grooves 15 in the core 11 are coated with a paste of tin powder in a solution of zinc chloride. Fritted metal cakes are provided by distributing a mixture of 3.34 carats of 70 mesh diamond grit, 8.89 grams of bronze powder with a composition of 90% copper and 10% tin, and 5.93 grams of fine (minus 325 mesh) iron powder. This is equally distributed into 40 cavities in a separate presintering graphite mold, each cavity being ½ inch by ⅛ inch by .080 inch. The metal powder slugs are presintered in a controlled atmosphere of dissociated ammonia for one hour at 1200° Fahrenheit. Each of the slugs so formed is placed in one of the mold cavities 29, and the punches 31 are inserted and the assembly heated by electrical resistance, to a temperature of 1750° Fahrenheit. The metal powder diamond matrix forming the finished cutting saw blade is compressed to a dimension of ½ inch by .080 inch by 1/16 inch. Each cutting element 17 is bonded integrally with the sides and base of its groove 15, overlapping slightly, and has .008 inch greater thickness than the width of the core 11. The protruding metal prongs of the core 11 which are now about ½ inch above the cutting elements 17 are ground off and the blade sharpened and tested.

The cutting action of the diamond abrasive saw blade according to the invention is superior to that of other types in that the blade cuts smoothly and evenly without having a tendency to grab or bog down. One of the advantages of the present saw blade is that the relief or "set" of the blade is completely uniform. This refers, see FIG. 2, to the greater width of the cutting elements 17 as compared to the width of the core 11. This is because the pressing and bonding of the compact forming the cutting elements 17 to the core 11 are accomplished simultaneously in a mold which can be precision machined to extremely accurate limits. The heating of the mold and core with its compact or metallic diamond bearing section 17 is done only once and all expansion due to heating is equal on all parts of the blade, eliminating inaccuracies in placing the diamond sections 17 on the core due to different expansion of various portions of the core 11. The bond strength of the cutting elements 17 to the core 11 is greatly superior to the bond strengths encountered in prior art blades of the type previously mentioned. This results from the ability to lock the metallic diamond sections 17 in the drive core body 11 with attachment at the ends as well as on the under surface. The diamond cutting sections 17 are protected from shock by being immersed in the body of the core 11 with no section protruding to catch and be torn off.

Undercutting of the cutting elements 17 as previously explained during the operation of the saw blade is minimized due to the homogenous nature of the cutting elements 17 and the thin layer of bonding medium between the bases of the cutting elements 17 and their respective grooves 15. The overlapping of the cutting elements 17 radially inwardly of the peripheral edge of the core 11 as shown in FIG. 2 further reduces deterioration of the saw blade due to undercutting or underwearing. The saw blade of the invention has a desirable completely unitary construction with the cutting sections 17 enclosed by and protected within the metal of the edge of the core 11. The presence of substantial amounts of diamond free metal of the core 11 on the cutting edge of the blade serves, in addition to protecting the cutting elements 17 from shock, to prevent grabbing and seizing of the saw blade during cutting.

The method of manufacture herein described is advantageous in that it embodies the mold or die used in forming the diamond bearing sections 17 as an integral part of each saw blade, resulting in essentially a new mold for each section 17. The high cost of forming the cutting elements in separate molds which tended to deteriorate due to the abrasive action of the diamond grit is eliminated. The present method of manufacture of diamond abrasive saw blades by combining the formation of the cutting element compact and the act of bonding it to the core in one operation reduces the cost of manufacture.

It may be mentioned that the saw blade herein described as a preferred embodiment is particularly useful in cutting relatively hard building materials. For instance, it will cut smoothly and rapidly through furring tile, bottom brick, marble, and sand lime brick. The saw blade is extremely efficient in these applications.

Figure 5:
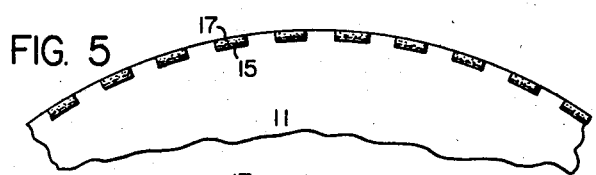
FIGS. 5 through 10 are fragmentary face views of other embodiments of the saw blade showing in particular different land and groove combinations.
Figure 6:
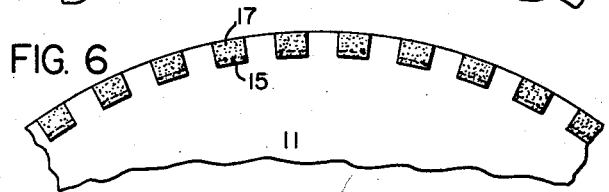
Figure 7:
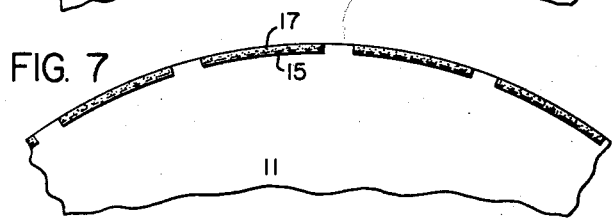
Figure 8:
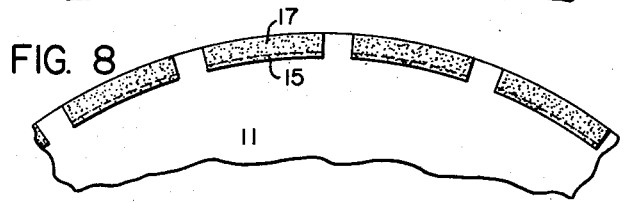
Figure 9:
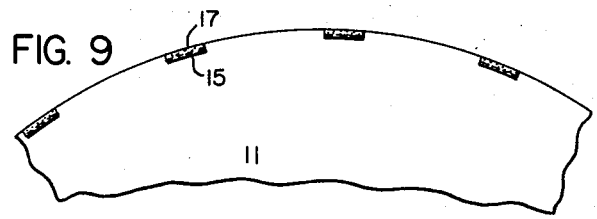
Figure 10:
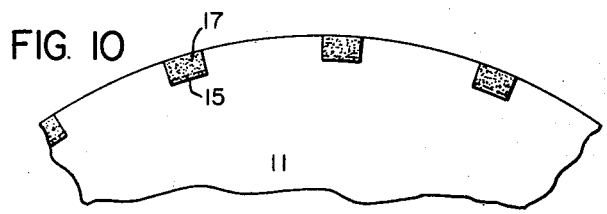

In FIGS. 5 through 10 are illustrated various land and groove combinations for the cutting elements 17 and the core 11, other than that illustrated in FIGS. 1 and 4. In each figure, the core 11 has a peripheral groove 15 in which is embedded a cutting element 17 in the identical manner as previously described, although in these embodiments the circumferential length of the cutting elements 17, their circumferential spacing, and their depth are somewhat different. In FIGS. 5, 7, and 9, the depth in radial direction of the cutting elements 17 is about the same as in FIG. 1, namely 1/16 inch. In FIGS. 6, 8, and 10, the depth of the cutting elements 17 is considerably greater, in the order of 1/8 or 3/16 of an inch. In FIGS. 5 and 6 the length of the cutting elements 17 is considerably shorter than that in FIG. 1, about 1/4 inch, while the circumferential spacing between two adjacent elements 17 is about the same. In FIGS. 7 and 8 the circumferential length of the cutting elements 17 is considerably longer than in FIG. 1, while the circumferential spacing is about the same. FIGS. 9 and 10 illustrate cutting elements 17 having a length considerably shorter than illustrated in FIG. 1, but the circumferential spacing between adjacent elements 17 is considerably longer than is illustrated in FIG. 1. Saw blades of the types illustrated in FIGS. 5 to 10 produce different cutting actions and are useful for different applications. It may be mentioned again that the length of diamond free metal of the protrusions 19 of the core 11 between the cutting sections 17 may vary between about 20% to 60% of the peripheral cutting edge of the saw blade.

Figure 11:
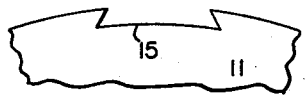
FIGS. 11 through 14 are fragmentary face views of still other embodiments of the invention showing in particular different groove configurations.
Figure 12:
Figure 13:
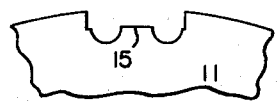
Figure 14:
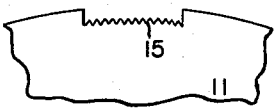

FIGS. 11 to 14 illustrate various modifications of the shape of the groove 15 in the periphery of the core 11. FIG. 11 illustrates a groove 15 having a dovetail shape. In FIG. 12 the arcuate base of the groove 15 has a semicircular recess in its central portion. In FIG. 13, the base of the groove 15 has semicircular recesses at both ends. In FIG. 14, the base of the groove 15 has a saw tooth configuration. These various groove configurations improve the retention of the cutting elements in the grooves 15. In FIG. 11, the dovetail ends of the groove support the ends of the cutting element 17 in an improved manner. In FIGS. 12 through 14, the length of the groove 15 is increased so that a larger edge length of the cutting element 17 is bonded to the core 11.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

This application is a division of application Serial No. 410, filed January 4, 1960, and now abandoned.

What is claimed is:

1. A method of manufacturing a diamond abrasive cut off saw blade of the edge cutting type comprising the steps of providing a circular sheet metal core of a slightly larger diameter than the finished saw blade, cutting a plurality of circumferentially spaced relatively deep grooves in the periphery of said core, attaching a pair of circular mold plates to the opposite sides of said core to form temporary mold surfaces, said plates having a diameter approximately equal to that of said core and having opposite peripheral radial rings forming a mold cavity with the bottom and end edges of each of said grooves, preforming a plurality of cutting section slugs composed of diamond grit dispersed and embedded in a mixture of metallic matrix powder, inserting one of said slugs into each of said cavities in a selected area, heating the plate and core assembly while simultaneously exerting pressure on a punch inserted into each said cavity to compress each respective slug, removing said mold plates, and removing the excess core portions between said grooves to a radial level flush with the outer edges of said cutting sections.

2. A method of manufacturing a diamond abrasive cut off saw blade of the edge cutting type comprising the steps of providing a circular sheet metal core of a slightly larger diameter than the finished saw blade, cutting a plurality of circumferentially spaced relatively deep grooves in the periphery of said core, attaching a pair of circular graphite mold plates to the opposing sides of said core to form temporary mold surfaces, said graphite plates having a diameter approximately equal to that of said core and having opposite peripheral radial rings forming a mold cavity with the bottom and end edges of each of said grooves, presintering a plurality of cutting section slugs composed of diamond grit dispersed and embedded in a mixture of metallic matrix powder, applying a bonding medium to the bottom and end edges of said grooves, inserting one of said presintered slugs into each of said mold cavities in a selected area, heating the graphite plate and core assembly, inserting a punch in each of said mold cavities to compress said slugs and simultaneously sinter, bond and consolidate said cutting sections, removing said mold plates, and removing the excess core portions between said grooves to a radial level flush with the outer edges of said cutting sections.

3. A method as defined in claim 2, including the additional step of cutting radial slots into said core circumferentially spaced from one another between spaced pairs of said grooves, said graphite plate and core assembly being heated only in the area between two of said radial slots at a time.

4. A method of manufacturing a diamond abrasive cut off saw blade of the edge cutting type comprising the steps of providing a circular sheet metal core of a slightly larger diameter than the finished saw blade, cutting a plurality of circumferentially spaced relatively deep grooves in the periphery of said core, attaching a pair of circular graphite mold plates to the opposing sides of said core to form temporary mold surfaces, said graphite plates having a diameter approximately equal to that of said core and having opposite peripheral radial rings cut to a radial depth slightly inward of the bottom of said grooves and forming a mold cavity with the bottom and end edges of each of said grooves, applying a bonding medium to the bottom and end edges of said groove, presintering a plurality of cutting section slugs at about 1200° F. each composed of diamond grit dispersed and embedded in a mixture of bronze and iron powder, inserting one of said presintered slugs into each of said mold cavities in a selected area, heating the graphite plate and core assembly to a temperature of about 1750° F., inserting a punch in each of said mold cavities to simultaneously compress, sinter, and bond said cutting sections to said core, removing said mold plates, and removing the excess core portions between said grooves to a radial level flush with the outer edges of said cutting sections.

5. The method of making a diamond abrasive saw blade of the edge cutting type having a series of diamond-bearing segments at spaced intervals around the circumference of a circular disk of wrought metal, which comprises the steps of (a) providing a wrought metal disk of circular outline;

(b) forming a series of circumferentially spaced grooves in the periphery of said disk through the thickness thereof, each groove having a radial depth substantially greater than the final radial thickness of the diamond-bearing segments upon completion of the saw blade and having a circumferential length also substantially greater than said final radial thickness;

(c) pre-forming a series of diamond-bearing segments of loosely compacted matrix material with diamond abrasive material therein, sufficiently united to constitute a slug capable of individual handling, each pre-formed slug having a length substantially equal to the circumferential length of the groove in the disk into which such slug is to be inserted and having a radial thickness substantially greater than its intended final radial thickness but not greater than the initial radial depth of such groove into which it is to be inserted and having a lateral thickness greater than the thickness of the wrought metal disk;

(d) placing a pair of temporary mold plates against opposite faces of the wrought metal disk to embrace the disk between the mold plates, the mold plates being shaped to engage the respective faces of the disk throughout part of their respective areas and to be relieved to provide mold surfaces laterally offset from the respective faces of the metal disk in the vicinity of the grooves in the disk;

(e) placing one or more pre-formed segment slugs in the space between the respective mold plates and into one or more respective grooves in the wrought metal disk;

(f) applying heat and radial pressure to the segment slugs to compress them to a substantial extent in a radial direction and to force them in other directions into tight engagement with the bottoms and the ends of their respective grooves in the wrought metal disk and with the adjacent mold faces of the temporary mold plates;

(g) repeating the foregoing steps (e) and (f) to such extent as necessary until each of the grooves in the periphery of the wrought metal disk has been provided with a respective segment slug compressed and secured therein;

(h) removing the temporary mold plates from the wrought metal disk; and (i) removing the projecting portions of the metal disk between successive segments until the outer peripheral edge of the wrought metal disk between successive segments constitutes substantially a smooth continuation of the outer peripheral edge of the segments, each segment being thicker in a lateral direction than the thickness of the wrought metal disk and projecting laterally beyond both respective faces of the wrought metal disk.

References Cited in the file of this patent

UNITED STATES PATENTS

| | | |
|---|---|---|
| 1,837,344 | Stauder | Dec. 22, 1931 |
| 2,225,193 | Benner et al. | Dec. 17, 1940 |
| 2,434,314 | Felker | Jan. 13, 1948 |
| 2,589,357 | Fantozzi | Mar. 18, 1952 |
| 2,686,439 | Tobert | Aug. 17, 1954 |
| 2,818,850 | Schwarzkopf et al. | Jan. 7, 1958 |